United States Patent
Muller

(10) Patent No.: US 6,917,846 B1
(45) Date of Patent: Jul. 12, 2005

(54) APPARATUS AND METHOD OF PROVIDING A WORK MACHINE

(75) Inventor: Thomas P. Muller, Montgomery, IL (US)

(73) Assignee: Caterpillar Inc, Peoria, IL (US)

( * ) Notice: Subject to any disclaimer, the term of this patent is extended or adjusted under 35 U.S.C. 154(b) by 639 days.

(21) Appl. No.: 09/717,573

(22) Filed: Nov. 21, 2000

Related U.S. Application Data

(60) Provisional application No. 60/210,058, filed on Jun. 7, 2000.

(51) Int. Cl.[7] ............................................. G06F 19/00
(52) U.S. Cl. .......................... 700/108; 701/50; 701/29; 702/182; 705/7; 705/11; 705/14; 700/111
(58) Field of Search ........................ 700/108–111, 275; 701/50, 35, 29; 702/174, 182–185; 705/1, 7, 9, 14, 400, 414

(56) References Cited

U.S. PATENT DOCUMENTS

| 5,220,968 | A | | 6/1993 | Weber |
| 5,659,470 | A | | 8/1997 | Goska et al. |
| 5,754,965 | A | * | 5/1998 | Hagenbuch .................. 701/35 |
| 5,815,826 | A | * | 9/1998 | Henderson et al. ........... 701/50 |
| 6,349,252 | B1 | * | 2/2002 | Imanishi et al. .............. 701/50 |
| 2002/0156666 | A1 | * | 10/2002 | Taylor et al. ................... 705/7 |

* cited by examiner

Primary Examiner—Leo Picard
Assistant Examiner—Steven R. Garland
(74) Attorney, Agent, or Firm—James R Smith; Byron G. Buck

(57) ABSTRACT

An apparatus and method of providing a work machine to a customer is disclosed. An embodiment includes at least one machine sensor and at least one computer. Signals indicative of the work performed by the machine are provided. The computer receives the signals and calculates the productivity of the machine.

38 Claims, 4 Drawing Sheets

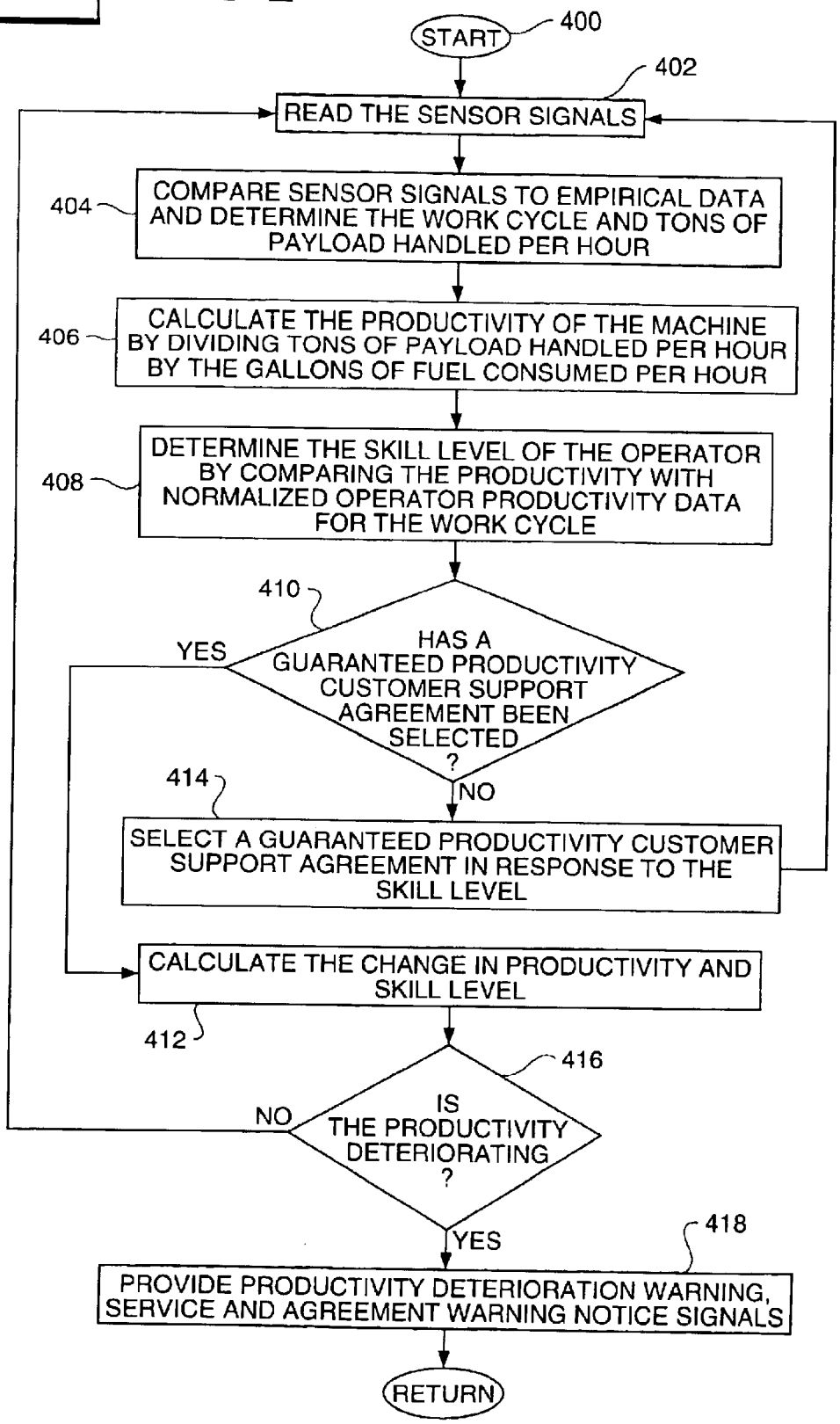

APPARATUS AND METHOD OF PROVIDING A WORK MACHINE

This application claims the benefit of prior provisional patent application Ser. No. 60/210,058, filed Jun. 7, 2000.

TECHNICAL FIELD

This invention relates generally to an apparatus and method of providing at least one work machine and, more particularly, to determining the productivity of a work machine.

BACKGROUND ART

Work machines having an attached implement, such as motorgraders, excavators, mining shovels, backhoe loaders, track-type tractors, wheeled tractors, compactors, wheel loaders, and the like, are used for moving earth. Such implements may include blades, impact rock rippers, buckets, and other material handling apparatus. Typically, work machines may be configured to perform various work cycles. For example, a wheel loader typically has a bucket used to rack, lift, dump, and lower a load and may be used to carry a load from one point to another point. These capabilities of a wheel loader are typically combined to perform a work cycle such as a hard bank loading, load and carry, truck loading cycle and the like.

In general, a work machine has a certain productivity, in terms of tons of material handled per gallon of fuel consumed. Productivity of the work machine is of imperative importance to the customer because it is generally directly related to the income and/or revenues received by the customer. Therefore, customers desire a work machine provider to execute a guaranteed productivity customer support agreement (CSA). These CSAs contractually guarantee a predetermined productivity of the work machine to the customer, thereby effectively shifting the risk of nonperformance (breakdown) to another party like the work machine provider or manufacturer.

Ideally, work machine providers, whether they be manufacturers, dealers, rental fleet operators or the like, could monitor the work machine and determine when maintenance and service of the work machine was necessary prior to a significant deterioration of productivity, or even worse a breakdown of the work machine, thereby enabling providers to execute a CSA. However, to date, work machine providers have had difficulty accurately and consistently determining the need for maintenance and service of a work machine before productivity significantly deteriorates. Customer support agreements typically available today are generally based on a level of machine maintenance or machine availability.

Accordingly, the art has sought an apparatus and method of determining the productivity of a work machine which: senses the work performed by the machine; calculates the productivity of the machine; selects a guaranteed productivity customer support agreement in response to the productivity; may be used in a timely and efficient manner; and is more economical to manufacture and use.

It is known from U.S. Pat. No. 5,065,349 to Thomas of Nov. 12, 1991, to measure the performance of an individual who rents a vehicle or other complex machine to be sure the machine is not abused during such rental use. Further, it is known from U.S. Pat. No. 5,631,832 to Hagenbuch of May 20, 1997, to process data derived from the weight of a load carried by a hauling vehicle, detect the change in the weight of the load, formulate data indicative of hauling conditions of the vehicle, and accumulate historical data for formulating management decisions directed to the future operation of the vehicle. Additionally, it is known from U.S. Pat. No. 5,808,907 to Shetty et al. of Sep. 15, 1998, to provide information relating to a machine to a user by sensing predetermined events relating to the machine, producing corresponding event signals, delivering the event signals to a remote site, comparing the event signals to a profile of events corresponding to the user and delivering a notification signal to the user if the event signals match a profile.

However, it is currently difficult for a work machine provider to accurately and consistently predict when a work machine needs service and maintenance prior to productivity significantly deteriorating so that the provider can economically execute a guaranteed productivity customer support agreement with a customer.

The present invention is directed to overcoming one or more of the problems as set forth above.

DISCLOSURE OF THE INVENTION

In an embodiment of the present invention a system for determining a guaranteed productivity support agreement for a customer is provided. The system includes at least one machine sensor and at least one computer. The at least one machine sensor is adapted to provide at least one machine sensor signal indicative of the work performed by the machine. The computer is adapted to receive the sensor signal, calculate the productivity of the machine and select a guaranteed productivity customer support agreement in response to the productivity.

In an embodiment of the present invention a method for determining a guaranteed customer support agreement for customer is provided. The method includes the steps of determining the productivity of the machine and generating a guaranteed productivity customer support agreement establishing at least one minimum productivity limit.

In an embodiment of the present invention a system for measuring operator productivity of at least one work machine for customer is provided. The system includes at least one machine sensor and a computer. The machine sensor is adapted to provide at least one machine sensor signal indicative of the operation performed by the machine, the payload handled by the machine and the amount of fuel consumed by the machine. The computer includes a central processing unit and is adapted to receive the sensor signals and calculate the productivity of the machine, the productivity being a function of an amount of fuel consumed and at least one of a payload handled by the machine and an operation performed by the machine.

In an embodiment of the present invention a method of providing incentives to an operator of a work machine is provided. The method includes the steps of determining a work cycle performed by the machine, determining the productivity of the machine, comparing the productivity of the machine with normalized operator productivity data for the work cycle, determining a skill level of the operator in response to comparing the productivity of the machine with the productivity data, determining the change in skill level of the operator in response to comparing the productivity of the machine with the productivity data and providing an incentive to the operator for at least achieving a predetermined change in skill level.

In an embodiment of the present invention a system for determining when a work machine needs service is provided. The system includes at least one machine sensor and a computer. The at least one machine sensor is adapted to provide at least one machine sensor signal indicative of the operation performed by the machine, the payload handled by the machine and the amount of fuel consumed by the machine. The computer is adapted to receive the sensor signals, calculate the productivity of the machine, determine the skill level of the operator, calculate the change in productivity of the machine and skill level of the operator, determine whether the productivity of the machine is deteriorating and provide a service notice signal in response to determining whether the productivity of the machine is deteriorating.

In an embodiment of the present invention, a work machine adapted to be controlled by an operator and for acting upon a load through a plurality of work cycles is provided. The work machine includes a frame, plurality of ground engaging devices, an operator compartment, an implement, an engine and a system. The plurality of ground engaging devices support the frame. The operator compartment is supported by the ground engaging devices. The implement has a linkage for operably connecting the implement to the frame. The engine is operably coupled to the ground engaging devices. The system includes at least one machine sensor and a computer. The at least one machine sensor is adapted to provide at least one machine sensor signal indicative of the operation performed by the machine, the payload handled by the machine and the amount of fuel consumed by the machine. The computer is adapted to receive the sensor signals, calculate the productivity of the machine and determine a skill level of an operator of the machine.

In an embodiment of the present invention a system for determining fees to be paid by a customer that are based on machine productivity is provided. The system includes at least one machine sensor and a computer. The at least one machine sensor is adapted to provide at least one machine sensor signal indicative of the operation performed by the machine, the payload handled by the machine, and the amount of fuel consumed by the machine. The computer is adapted to received the sensor signals, calculate the productivity of the machine and determine a skill level of the operator of the machine.

BRIEF DESCRIPTION OF THE DRAWINGS

For a better understanding of the invention, reference may be made to the accompanying drawings in which:

FIG. 4 is a flow chart of software logic implemented in an embodiment of the present invention.

BEST MODE FOR CARRYING OUT THE INVENTION

A preferred embodiment of the present invention provides an apparatus and method of providing at least one work machine to a customer. The following description uses a wheel loader as an example only. This invention can be applied to other types of work machines and other types of implements as is well known in the art. Other examples include, mining shovels, motorgraders, backhoe loaders, track-type tractors, wheeled tractors, compactors, track-type rotors, and the like.

Figure 1:
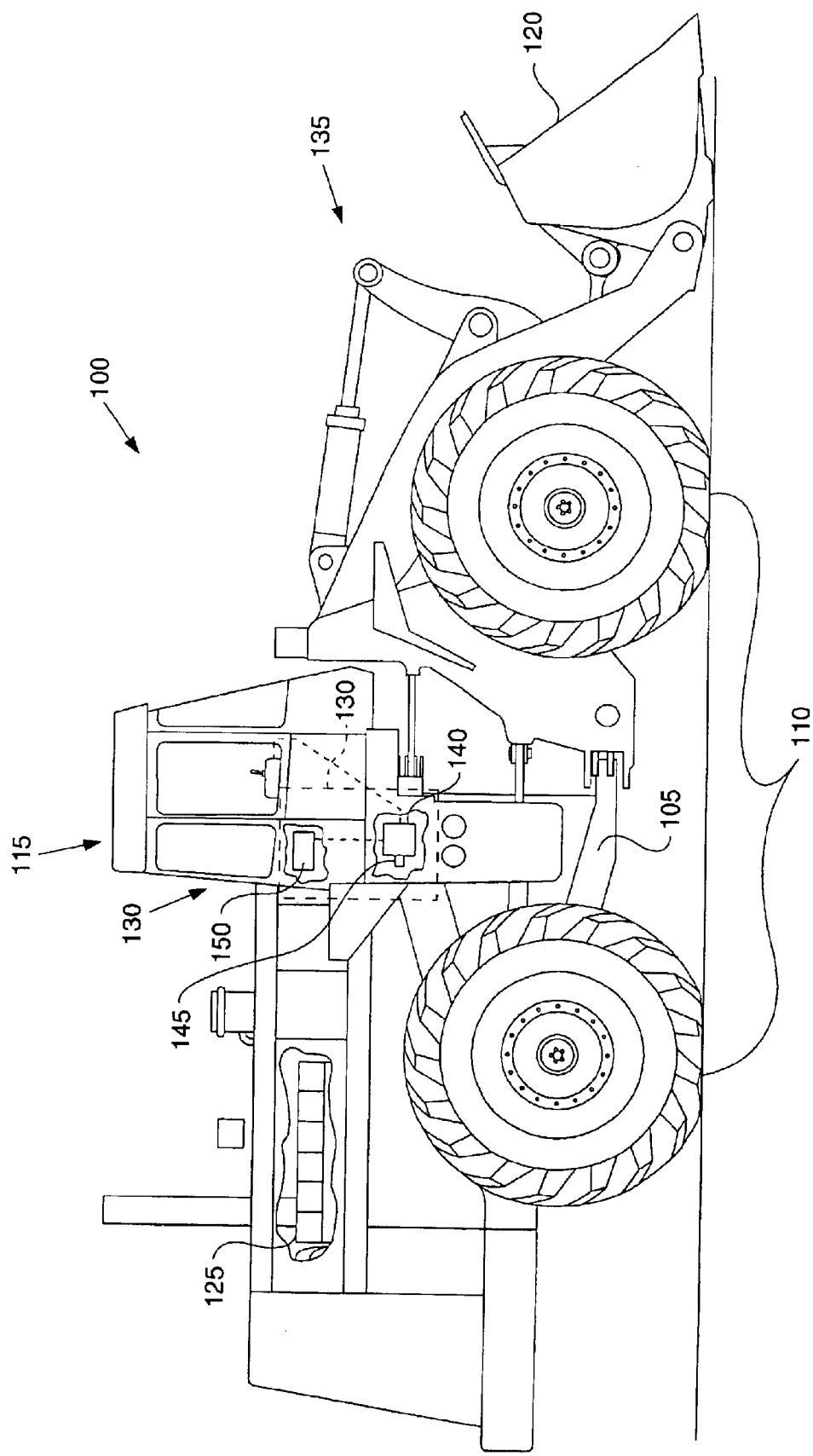
FIG. 1 is a side view of a work machine of a preferred embodiment of the present invention.

In FIG. 1, a work machine 100 having a frame 105, plurality of ground engaging devices 110, an operator compartment 115 an implement 120, an engine 125 and a system 130.

The plurality of ground engaging devices 110 support the frame 105 and the operator compartment 115. The implement 120 may have a linkage 135 for operably connecting the implement 120 to the frame 105. The engine 125 is operably coupled to the ground engaging devices 110.

The system 130 includes at least one machine sensor (not shown), a computer 140, preferably associated with at least one data storage device 145, and preferably includes a communication device 150.

The machine sensor is adapted to provide machine sensor signals indicative of the work performed by the work machine 100. Preferably, the machine sensors include at least one operation sensor adapted to provide operating sensor signals indicative of the operation performed by the machine, at least one payload sensor adapted to provide payload sensor signals indicative of the payload handled by the machine and at least one fuel sensor adapted to provide fuel consumption sensor signals indicative of the amount of fuel consumed by the machine. The operation sensor may be any or a combination of pressure sensors or transducers, flow sensors or transducers, radial or axial sensors, transducers or potentiometers, sonic, microwave, laser, waveguide or other device or system for determining the angles of displacement about a pivot joint or relationship of the implement 120 to the rest of the work machine 100 or for determining the movement of the ground engaging devices 110 with respect to the rest of the work machine 100. Similarly, the payload sensor could be any or a combination of pressure sensors or transducers, flow sensors or transducers, radial or axial sensors, transducers or potentiometers and other sonic, microwave, laser, waveguide or other device or system for indicating the weight of the payload handled by the work machine 100.

As should be appreciated, the at least one fuel sensor may be any or a combination of a fuel tank fuel level sensor; a fuel or lubricating or hydraulic fluid line pressure or flow sensor or transducer; a device for measuring, controlling and/or accumulating fuel injection to a combustion chamber of engine 125; a suction gas monitoring system; an exhaust gas monitoring system; and the like.

The at least one data storage device 145 may be any of a number of data storage devices adapted to store information on a storage medium such as random access memory, read-only memory, electrically erasable programmable read-only memory, traditional hard drives, optical discs and the like. Preferably, the data storage device 145 stores information including empirical data, values representing a message record, values representing the sensor signals, normalized operator productivity data for at least one work cycle, normalized expected improvement in skill level data for at least one work cycle and guaranteed productivity customer support agreements.

The computer 140 is adapted to receive these sensor signals and calculate the productivity of the machine 100. The computer 140 preferably includes a central processing unit for receiving the sensor signals and calculating the productivity of the machine 100. Preferably, computer 140 is one of many readily available computers capable of processing numerous instructions. It should be appreciated that computer 140 may include multiple processing units configured in a distributed structure environment and forming a system. Such distributed processors may be continuously or intermittently connected through any of numerous communications devices including such devices as direct hardwired data links, radio and other transmission devices, optical transmission devices and the like.

Preferably, the productivity is a function of the amount of fuel consumed and at least one of the payload handled by the machine and the operation performed by the machine. However, it should be appreciated that the productivity could be determined by other methods of calculating or approximating the work performed by the machine 100 within a time period.

In one or more embodiments of the present invention it may be advantageous for the computer 140 to be adapted to perform one or more of the tasks explained below.

Advantageously, the computer 140 compares the sensor signals to empirical data and determines a work cycle performed by the machine 100. It is appreciated that the specific values of the empirical data depend upon the specific model and in many cases configuration of the work machine 100. However, such data can be readily and easily determined through experimentation by monitoring the movements of the machine and the operating characteristics of the control systems, including flows, pressures and the like such that particular characteristics of the machine 100 can be identified and associated various work cycles.

Advantageously, computer 140 may provide a productivity notice signal indicative of the productivity of the machine 100.

Figure 2:
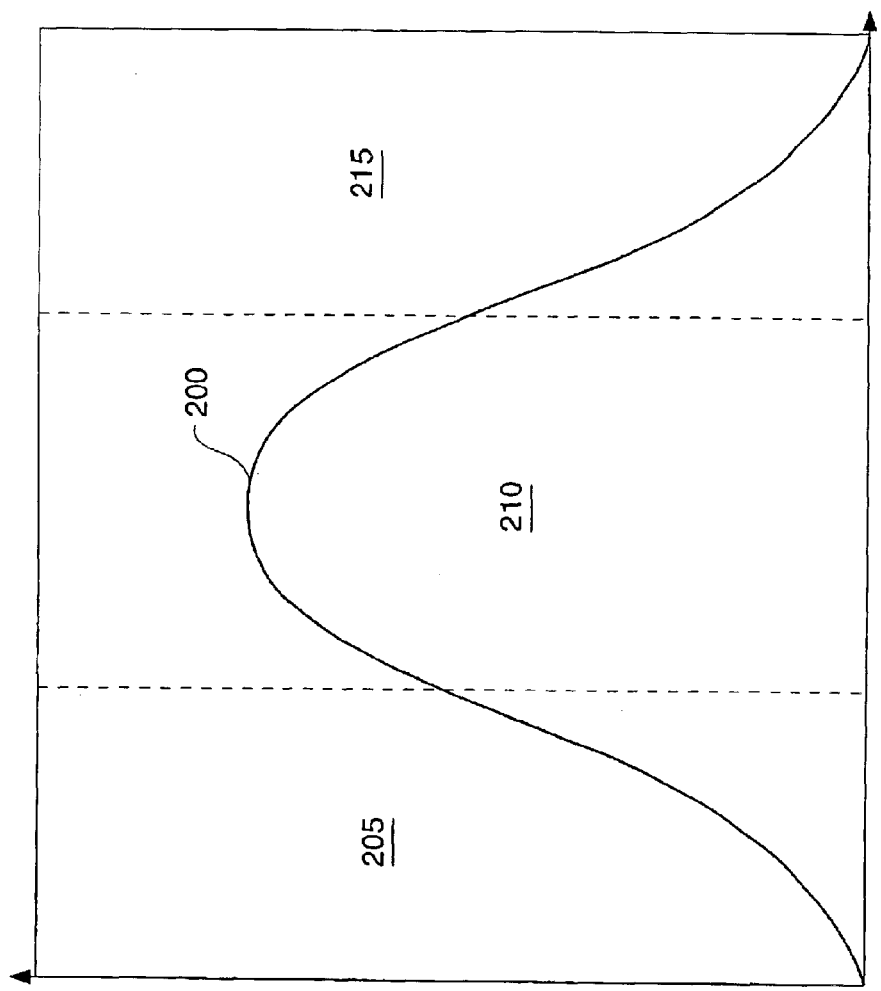
FIG. 2 is a graph of normalized operator productivity data for an embodiment of the present invention.

Preferably, the computer 140 determines the skill level of the operator and may additionally provide a skill level notice signal. The skill level of the operator is preferably determined by comparing the productivity of the machine 100 with the normalized operator productivity data for the work cycle. Such a distribution curve 200 indicating the relative skill levels of an operator is shown in FIG. 2. Advantageously the skill levels are novice 205, average 210 and expert 215. It should be appreciated that the specific normalized operator productivity data for the work cycle may vary with model and configuration of work machine 100. The distribution curve 200 is shown by a curve of productivity in terms of tons per gallon per hour, tons per gallon per mile, or the like for various work cycles. It should be appreciated that any number of skill level classifications could be readily and easily used without deviating from scope of the present invention as defined in the appending claims.

Preferably, the computer 140 selects and/or generates a CSA. Advantageously, the CSA establishes at least one minimum productivity limit and a corresponding price in response to the productivity of the machine or alternatively the skill level. It is advantageous for the computer 140 to select a particular CSA from a plurality of CSAs based upon the productivity of the machine 100 during a trial or initial period of use.

A CSA could be any of a number of documents containing terms of sale, rental, lease, and the like and includes terms guaranteeing the level of productivity of machine 100. Computer 140 preferably selects a CSA with a minimum productivity limit substantially corresponding to the productivity of the machine 100 during the trial period. The productivity limit may vary during the term of the CSA with the experience of the operator.

Preferably the computer 140 continues to monitor the machine 100 and continuously calculates the productivity of the machine 100 and determines the skill level of the operator. Additionally, it is advantageous for the computer 140 to calculate the change in productivity of the machine and skill level of the operator over a predefined time period. It should be appreciated that numerous different time periods could be readily and easily used without deviating from the scope of the present invention as defined in the appended claims. For example, many different time periods could be used depending upon the resolution desired. Preferably, this could be calculated on a daily basis.

Advantageously, the data storage device is adapted to store the change in productivity of the machine and skill level of the operator. This historical data may be provided to the computer and/or operator, service organization, customer or owner of the machine 100.

Preferably, computer 140 determines whether the productivity is deteriorating. Advantageously, the computer 140 compares the change in productivity of the machine 100 with the normalized expected improvement in skill level data to determine whether the productivity is deteriorating.

Figure 3:
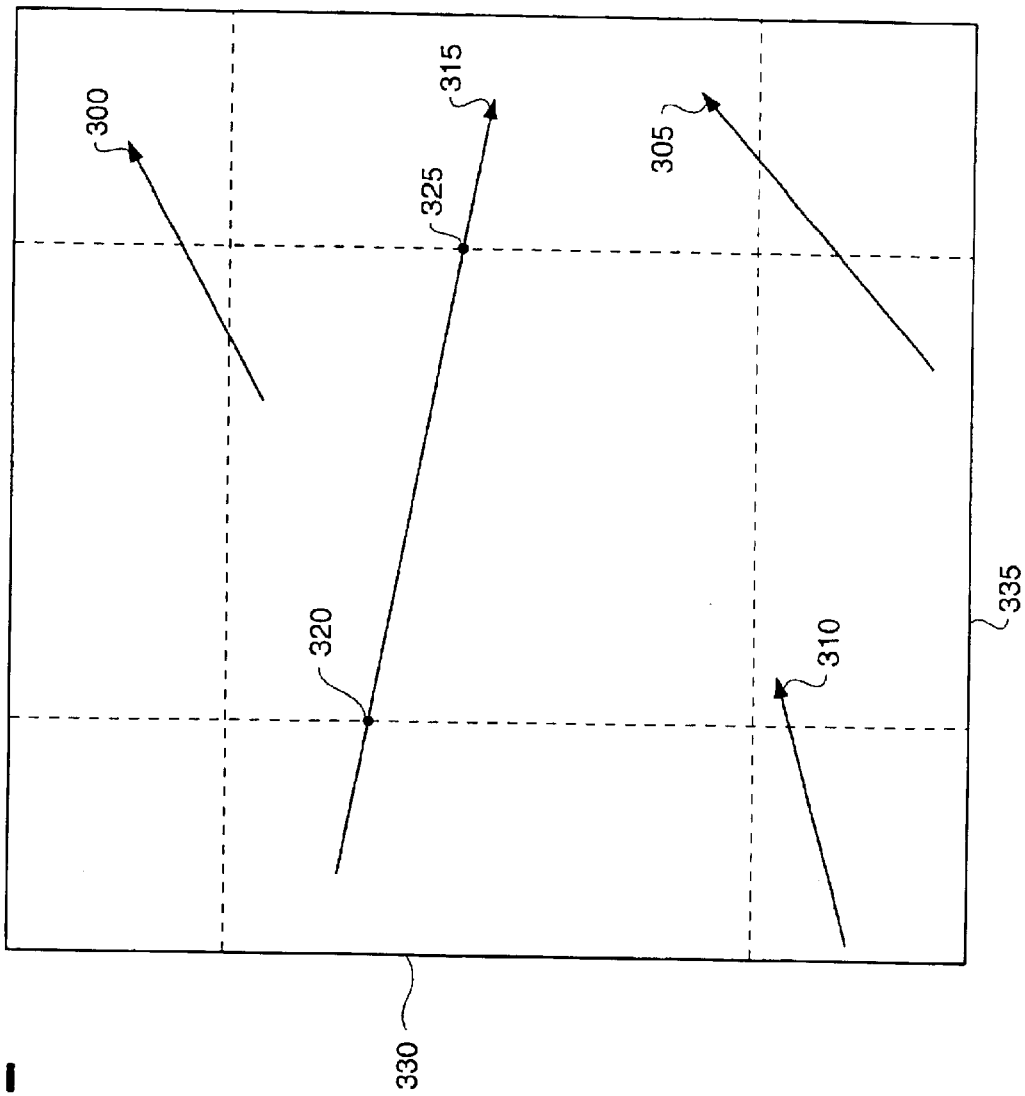
FIG. 3 is a graph of productivity versus fuel consumed for several work cycles for an embodiment of the present invention.

For example, in FIG.3 load and carry data curve 300, hard bank data curve 305 and clean up data curve 310 all are representative curves indicating an expected relationship between the tons of payload handled, vertical axis 330, and the fuel consumed by a machine 100, horizontal axis 335. As the skill level of the operator increases with experience the tons of payload handled by the machine 100 increases with the fuel consumed. Truck loading data curve 315 is representative of a relationship between the tons of payload handled and the fuel consumed by machine 100 and indicates a potential problem. Productivity of machine 100 generally corresponding to these data curves may advantageously be compared with the normalized expected improvement in skill level data to determine if the productivity has changed as the skill level of the operator is generally expected to increase as a result of additional experience. If the skill level of the operator is expected to increase as shown in FIG. 2, then computer 140 would determine that there was a deterioration in productivity of the machine 100 if the change in productivity of machine 100 changes from initial productivity 320 to subsequent productivity 325 during a truck loading work cycle. It should be understood that tolerances of a reasonable amount may be employed in the comparisons. The actual tolerance employed is dependent, at least partially, on the resolution desired and can be readily and easily determined through numerical analysis or experimentation for the particular model and configuration of the machine 100.

If computer 140 determines there was a deterioration in productivity of the machine 100, then it is advantageous for the computer 140 to provide one or more notice signals indicating any of a variety of levels of deterioration in productivity. Such notice signals may include a productivity deterioration warning notice signal, a service notice signal, a CSA warning notice signal and the like. A productivity deterioration warning notice signal would preferably provide an early warning and indicate that the productivity is beginning to deteriorate. A service notice signal would preferably indicate that the productivity has deteriorated and that maintenance should be performed. A CSA warning notice signal would preferably provide a warning and indicate that the productivity is deteriorating and is falling or will likely fall below the minimum productivity limit guaranteed in the CSA.

Preferably, computer 140 generates at least one message record. The message record advantageously includes at least one of the sensor signals and notice signals.

Referring back to FIG. 1, communication device 150 is preferably adapted to receive the message record and provide the message record to at least one of the operator, a service organization, the customer and an owner of the machine. The communication device 150 is generally a device capable of transferring the message record and may include such devices as data transmission wires, modems, radios and other signal transmission devices, optical transmission devices, wave guides, microwave communication devices, satellite communication devices and the like. Communication device 150 advantageously includes a user interface system that may be any or a combination of interface devices readily available such as radio reception and generation devices, scanners, modems, printers, fax machines, bar code readers, touch screens, and preferably a video display or graphic display in combination with a keyboard. Additionally, it may be advantageous for the interface system to include a printer adapted to provide a document indicating the signals included in the message record and to provide a document indicating and/or including the CSA.

Referring now to FIG. 4, a flowchart of the software logic used in connection with the preferred embodiment is shown. Those skilled in the art could readily and easily write software implementing the flowchart shown in FIG. 4 using the instruction set, or other appropriate language associated with the particular microprocessor to be used. First block 400 begins the program control. Program control passes from first block 400 to second block 402. In second block 402, information is read from the sensor signals. From second block 402, program control passes to third block 404.

In third block 404, the computer compares the sensor signals to the empirical data and determines the work cycle and tons of payload handled per hour. From third block 404 program control passes to fourth block 406.

In fourth block 406, the computer 140 calculates the productivity of the machine 100 by dividing tons of payload handled per hour by the gallons of fuel consumed per hour. From fourth block 406, program control passes to fifth block 408.

In fifth block 408, the computer 140 determines the skill level of the operator by comparing the productivity with normalized operator productivity data for the work cycle. From fifth block 408, program control passes to firth decision block 410.

In first decision block 410, the computer 140 determines whether a guaranteed productivity customer support agreement has been selected. If a CSA has been selected, program control passes to sixth block 412. Otherwise, program control passes to seventh block 414.

In seventh block 414, the computer 140 selects a guaranteed productivity customer support agreement in response to the skill level. From seventh block 414 program control passes to second block 402.

In sixth block 412, the computer 140 calculates the change in productivity and skill level. From sixth block 412 program control passes to second decision block 416.

In second decision block 416, the computer 140 determines whether the productivity is deteriorating. If the productivity is not deteriorating, program control passes back to second block 402. Otherwise, program control passes to eighth block 418.

In eighth block 418, the computer 140 provides productivity deterioration warning service and agreement warning notice signals. From eighth block 418, program control returns to the main program.

The logic of FIG. 4 is performed frequently enough to provide the desired resolution and time responsiveness for determining and alerting at least one of an operator, a service organization, the customer and an owner of the work machine 100 of a deterioration in productivity and preferably performed daily.

While aspects of the present invention have been particularly shown and described with reference to the preferred embodiment above, it will be understood by those skilled in the art that various additional embodiments may be contemplated without departing from the spirit and scope of the present invention. For example, any of a number of different methods for determining the work or productivity of a work machine 100 could be readily and easily used to determine a CSA. Additionally, the expected improvement in skill level data and relative skill levels may vary in any of many possible patterns and may not be normalized. However, a device or method incorporating such an embodiment should be understood to fall within scope of the present invention as determined based on the claims below and any equivalence thereof.

INDUSTRIAL APPLICABILITY

Work machines 100 having an attached implement 120, such as motor graders, excavators, mining shovels, backhoe loaders, wheel loaders, track-type tractors, wheeled tractors, compactors, motor graders, and the like, are used for handling a payload, for example, moving earth. Typically, work machines may be configured to perform various work cycles such as load-and carry, truck loading, hard bank, clean up and the like.

Today, most customer support agreements are based on a level of machine maintenance or machine availability. With the introduction of more intelligent machines 100 it is possible to measure the productivity during various work cycles and determine a CSA that guarantees certain productivity numbers.

These more intelligent machines 100 have many sensors and computers 140 that are used for information and control. This gives the machines 100 an ability to generate, track and store more information. Additionally, the inclusion of these devices in a machine 100 makes the machine 100 easier to operate and more productive. This is at least partially a result of automated aspects of various work cycles.

In general, sensors can be used to determine what the machine 100 is doing or the work cycle it is performing. The sensors can also determine the amount of payload that the machine 100 is handling. In the case of a wheel loader having a bucket as the implement 120, sensors can measure the amount of material in the bucket, the amount of fuel consumed to complete the task and the performance of the operator as compared against a predetermined performance level.

For example, it is known that an expert operator, in a truck loading operation, can load the bucket, back up turning, and go forward to dump the payload from the bucket into a truck and the tires only make three quarter (¾) of a revolution. The sensors can monitor the number of tire revolutions performed by the operator performing the truck loading work cycle. The computer 140 is able to time the work cycle. Less skilled operators require many more revolutions and therefore, more time (e.g. inexperienced operators may perform the same work cycle using as many as two and one-half (2½) tire revolutions and significantly more time). This information and productivity can be stored in a data storage device 145 along with average performance data for many work cycles.

In at least one embodiment of the present invention it is advantageous to provide an incentive to the operator for at least achieving a predetermined change in skill level. Such a predetermined change in skill level can be determined by considering the normalized expected improvement in skill level data. Advantageously, the incentive is at least one of a reward, penalty, compensation and a failure to impose at least one of the reward, penalty and compensation and preferably includes a bonus provided to the operator.

It is advantageous for the machine 100 to include a communications device 150 such as a wireless transmitter for transmitting information and productivity data to a distributed database where data for numerous machines 100 can be stored. Preferably this information is transmitted at the end of each shift or day if multiple shifts are used.

Additionally, the change in skill level of the operator may be monitored and stored. The relative skill level of an operator may be determined and stored for any given work cycle performed during a trial period near the time the machine is provided. As the operator gains experience, his/her skill level should increase and move up along the normalized operator productivity curve. The expected progress of the operator in this manner gives rise to the normalized expected improvement in skill level data.

In an embodiment of the present invention the machine 100 can be provided to a customer where it would be used for a period of time. At the end of the period, all of the information can be transmitted to a distributed computer 140 and analyzed. Based on this analysis a CSA can be selected or generated and provided. The productivity of the machine 100 can continue to be monitored. If the computer 140 determines that the productivity is deteriorating, then a message record can be provided to the party guaranteeing the productivity of the machine 100 so that maintenance can be planned or conveniently scheduled.

The apparatus and method of certain embodiments of the present invention, when compared with other methods and apparatus, may have the advantages of sensing the work performed by the machine 100; calculating the productivity of the machine 100; selecting a CSA in response to the productivity; being used in a timely and efficient manner; and being more economical to manufacture and use. Such advantages are particularly worthy of incorporating into the design, manufacture, and operation of work machines 100. In addition, the present invention may provide other advantages that have not been discovered yet.

It should be understood that while the preferred embodiment as described in connection with a wheel loader, the present invention is readily adaptable to provide similar functions for other work machines 100. Other aspects, objects, and advantages of the present invention can be obtained from a study of the drawings, the disclosure, and the appended claims.

What is claimed is:

1. A system for determining a customer support agreement, comprising:
   at least one machine sensor adapted to provide at least one machine sensor signal representing a work indicator of a machine; and
   at least one computer adapted to
      receive the sensor signal,
      calculate a productivity of the machine, and
      select the customer support agreement in response to the productivity.

2. The system of claim 1, wherein the computer is adapted to determine whether the productivity of the machine is deteriorating and provide a productivity deterioration warning notice signal in response to determining the productivity of the machine is deteriorating.

3. A system for providing at least one work machine to a customer, comprising:
   at least one machine sensor adapted to provide at least one machine sensor signal indicative of an operation performed by the machine, a payload handled by the machine and an amount of fuel consumed by the machine; and
   a computer adapted to
      receive the sensor signal,
      calculate a productivity of the machine,
      select and generate a customer support agreement in response to the productivity of the machine,
      monitor the productivity of the machine,
      determine whether the productivity of the machine is deteriorating, and
      provide a productivity deterioration warning notice signal in response to determining the productivity of the machine is deteriorating.

4. The system of claim 3, wherein the machine sensor includes at least one operation sensor adapted to provide at least one operating sensor signal indicative of the operation performed by the machine, at least one payload sensor adapted to provide at least one payload sensor signal indicative of the payload handled by the machine and at least one fuel sensor adapted to provide at least one fuel consumption sensor signal indicative of the amount of fuel consumed by the machine.

5. The system of claim 4, including at least one data storage device adapted to store on a storage medium information including empirical data, values representing the sensor signals and normalized operator productivity data for at least one work cycle and wherein the computer is adapted to compare the sensor signals to the empirical data to determine a work cycle performed by the machine, determine a skill level of an operator and provide a skill level notice signal, the skill level of the operator being determined by comparing the productivity of the machine with the normalized operator productivity data for the work cycle and calculate a change in the productivity of the machine and a skill level of the operator, the data storage device being adapted to store a change in the productivity of the machine and the skill level of the operator.

6. A system for providing at least one work machine controlled by at least one operator to a customer, comprising:
   at least one operation sensor adapted to provide at least one operating sensor signal indicative of an operation performed by the machine;
   at least one payload sensor adapted to provide at least one payload sensor signal indicative of a payload handled by the machine;
   at least one fuel sensor adapted to provide at least one fuel consumption sensor signal indicative of an amount of fuel consumed by the machine;
   at least one data storage device adapted to store on a storage medium information including empirical data, values representing the sensor signals, normalized operator productivity data for at least one work cycle, normalized expected improvement in skill level data for at least one work cycle and at least one customer support agreement having at least one minimum productivity limit and corresponding price;
   a computer including a CPU adapted to
      receive the sensor signals,
      compare the sensor signals to the empirical data to determine the work cycle performed by the machine, calculate a productivity of the machine and provide a productivity notice signal, the productivity being a function of the amount of fuel consumed and at least one of the payload handled by the machine and the operation performed by the machine, determine a skill level of the operator and provide a skill level notice signal, the skill level of the operator being determined by comparing the productivity of the machine with the normalized operator productivity data for the work cycle, select and generate the customer support agreement establishing at least one minimum productivity limit and corresponding price in response to the skill level, monitor the machine, continuously calculate the productivity of the machine and determine the skill level of the operator, calculate a change in the productivity of the machine and the skill level of the operator, the data storage device being adapted to store the change in the productivity of the machine and a skill level of the operator, determine whether the productivity of the machine is deteriorating as a function of at least one of the change in the productivity of the machine, the change in the skill level of the operator and the normalized expected improvement in skill level data, provide a productivity deterioration warning notice signal in response to determining the productivity of the machine is deteriorating, provide a service notice signal in response to the step of determining whether the productivity of the machine is deteriorating, provide an agreement warning notice signal in response to the step of determining whether the productivity of the machine is deteriorating and considering the limit, generate at least one message record, the message record including at least one of the signals and the notice signals, and the data storage device being adapted to store values representing the message record; and at least one communication device adapted to receive the message record and provide the message record to at least one of the operator, a service organization, the customer and an owner of the machine.

7. A method of providing at least one work machine to a customer, the method comprising the steps of:

determining a productivity of the machine, the productivity being at least a function of a time period, a fuel consumed and at least one of a payload handled by the machine and an operation performed by the machine;

determining a skill level of an operator;

generating a customer support agreement establishing at least one minimum productivity limit and a corresponding price in response to the skill level;

determining whether the productivity of the machine is deteriorating; and communicating a productivity deterioration warning notice to at least one of the operator, a service organization, the customer and an owner of the machine.

8. The method of claim 7, including the steps of monitoring the operation of the machine and determining a work cycle performed by the machine.

9. The method of claim 8, wherein the machine is operated by the operator and including the steps of comparing the productivity of the machine with a normalized operator productivity data for the work cycle and determining the skill level of the operator in response to the step of comparing the productivity of the machine with the productivity data.

10. The method of claim 9, including the steps of performing comparisons of the productivity of the machine with the productivity data and determining a change in the skill level of the operator in response to the step of performing subsequent comparisons of the productivity of the machine with the productivity data.

11. The method of claim 10, including the step of providing an incentive to the operator for at least achieving a predetermined change in the skill level, the predetermined change in skill level being determined by considering a normalized expected improvement in the skill level, and the incentive being at least one of a reward, penalty, compensation, and failure to impose at least one of a reward, penalty and compensation.

12. The method of claim 10, including the steps of determining a productivity deterioration warning notice in response to performing subsequent comparisons of the productivity of the machine with the productivity data and considering the normalized expected improvement in the skill level, determining a service notice in response to the step of determining whether the productivity of the machine is deteriorating and determining an agreement warning in response to the step of determining whether the productivity of the machine is deteriorating and considering the limit.

13. The method of claim 12, including the step of generating at least one message record and including in the message record a signal indicative of at least one of the productivity, the skill level, the service notice, the agreement warning, the productivity deterioration warning notice, the time period, the fuel consumed, the payload handled by the machine and the operation performed by the work machine.

14. A method of providing at least one work machine controlled by at least one operator to a customer, the method comprising the steps of:

monitoring an operation of the machine;

determining a work cycle performed by the machine;

determining a productivity of the machine, the productivity being at least a function of a time period, a fuel consumed and at least one of a payload handled by the machine and the operation performed by the machine;

comparing the productivity of the machine with normalized operator productivity data for the work cycle;

determining a skill level of the operator in response to the step of comparing the productivity of the machine with the productivity data;

generating a customer support agreement establishing at least one minimum productivity limit and corresponding price in response to the skill level;

monitoring the machine;

performing subsequent comparisons of the productivity of the machine with the productivity data;

determining a change in the skill level of the operator in response to the step of performing subsequent comparisons of the productivity of the machine with the productivity data;

providing an incentive to the operator for at least achieving a predetermined change in the skill level, such predetermined change in the skill level being determined by considering a normalized expected improvement in the skill level, and the incentive being at least one of a reward, penalty, compensation, and failure to impose at least one of a reward, penalty and compensation;

determining whether the productivity of the machine is deteriorating and determining a productivity deterioration warning notice in response to performing subsequent comparisons of the productivity of the machine with the productivity data and considering the normalized expected improvement in the skill level;

determining a service notice in response to the step of determining whether the productivity of the machine is deteriorating;

determining an agreement warning in response to the step of determining whether the productivity of the machine is deteriorating and considering the limit;

generating at least one message record;

including in the message record a signal indicative of at least one of the productivity, the skill level, the service notice, the agreement warning, the productivity deterioration warning notice, the time period, the fuel consumed, the payload handled by the machine and the operation performed by the work machine; and communicating the message record to at least one of the operator, a service organization, the customer and an owner of the machine.

15. A work machine adapted to be controlled by an operator and for acting upon a load through a plurality of work cycles, comprising:

a frame;

a plurality of ground engaging devices supporting the frame;

an operator compartment supported by the ground engaging devices;

an implement having a linkage for operably connecting the implement to the frame;

an engine operably coupled to the ground engaging devices; and a system for determining a productivity customer support agreement for a customer, including:

at least one machine sensor adapted to provide at least one machine sensor signal representing a work indicator of the machine;

at least one computer adapted to receive the sensor signal, calculate a productivity of the machine, and select the customer support agreement in response to the productivity.

16. The work machine of claim 15, wherein the computer is adapted to determine whether the productivity of the machine is deteriorating and provide a productivity deterioration warning notice signal in response to determining the productivity of the machine is deteriorating.

17. A system for measuring operator productivity of at least one work machine for a customer, comprising:

at least one machine sensor adapted to provide at least one machine sensor signal indicative of an operation performed by the machine, a payload handled by the machine and an amount of fuel consumed by the machine;

at least one data storage device adapted to store information on a storage medium;

a computer adapted to receive the sensor signals, calculate a productivity of the machine, the productivity being a function of the amount of fuel consumed and at least one of a payload handled by the machine and an operation performed by the machine, calculate a change in the productivity of the machine, the data storage device being adapted to store the change in the productivity of the machine;

determine whether the productivity of the machine is deteriorating; and wherein the information includes empirical data, values representing the sensor signals, normalized operator productivity data for at least one work cycle and the computer is adapted to compare the sensor signals to the empirical data to determine the work cycle performed by the machine, determine a skill level of an operator and provide a skill level notice signal, the skill level of the operator being determined by comparing the productivity of the machine with the normalized operator productivity data for the work cycle, calculate a change in the skill level of the operator and determine whether the productivity of the machine is deteriorating as a function of at least one of the change in the productivity of the machine, the change in the skill level of the operator and the normalized expected improvement in skill level.

18. The system of claim 17, wherein the machine sensor includes at least one operation sensor adapted to provide at least one operating sensor signal indicative of the operation performed by the machine, at least one payload sensor adapted to provide at least one payload sensor signal indicative of the payload handled by the machine and at least one fuel sensor adapted to provide at least one fuel consumption sensor signal indicative of the amount of fuel consumed by the machine.

19. A system for measuring operator productivity of at least one work machine for a customer, comprising:

at least one machine sensor adapted to provide at least one machine sensor signal indicative of an operation performed by the machine, a payload handled by the machine and an amount of fuel consumed by the machine;

at least one data storage device adapted to store information on a storage medium;

a computer adapted to receive the sensor signals, calculate a productivity of the machine, the productivity being a function of the amount of fuel consumed and at least one of a payload handled by the machine and an operation performed by the machine, calculate a change in the productivity of the machine, the data storage device being adapted to store the change in the productivity of the machine; determine whether the productivity of the machine is deteriorating; and wherein the computer is adapted to provide a productivity deterioration warning notice signal in response to determining the productivity of the machine is deteriorating and generate at least one message record including the notice signal, the data storage device is adapted to store values representing the message record and at least one communication device is adapted to receive the message record and provide the message record to at least one of the operator, a service organization, the customer and an owner of the machine.

20. A method of providing incentives to an operator of a work machine, the method comprising the steps of:

determining a work cycle performed by the machine;

determining a productivity of the machine;

comparing the productivity of the machine with a normalized operator productivity data for the work cycle;

determining a skill level of the operator in response to the step of comparing the productivity of the machine with the productivity data;

determining a change in the skill level of the operator in response to comparing the productivity of the machine with the productivity data; and providing the incentive to the operator for at least achieving a predetermined change in the skill level.

21. The method of claim 20, including the steps of generating at least one message record including a signal indicative of the skill level and communicating the message record to at least one of the operator, a service organization, a customer and an owner of the machine.

22. A method of providing incentives to an operator of a work machine, the method comprising the steps of:

determining a work cycle performed by the machine;

determining a productivity of the machine, the productivity being at least a function of a time period, an amount of fuel consumed and at least one of a payload handled by the machine and an operation performed by the machine;

comparing the productivity of the machine with a normalized operator productivity data for the work cycle;

determining a skill level of the operator in response to the step of comparing the productivity of the machine with the productivity data;

determining a change in the skill level of the operator in response to comparing the productivity of the machine with the productivity data;

providing the incentive to the operator for at least achieving a predetermined change in the skill level, such predetermined change in the skill level being determined by considering a normalized expected improvement in the skill level, and the incentive being at least one of a reward, penalty, compensation, and failure to impose at least one of a reward, penalty and compensation;

determining whether the productivity of the machine is deteriorating and determining a productivity deterioration warning notice in response to performing subsequent comparisons of the productivity of the machine with the productivity data and considering the normalized expected improvement in the skill level;

generating at least one message record including a signal indicative of the skill level; and communicating the message record to at least one of the operator, a service organization, a customer and an owner of the machine.

23. A system for determining when a work machine needs service, comprising:

at least one machine sensor adapted to provide at least one machine sensor signal indicative of an operation performed by the machine, a payload handled by the machine and an amount of fuel consumed by the machine; and a computer adapted to receive the sensor signals, calculate a productivity of the machine, determine a skill level of an operator, calculate a change in the productivity of the machine and the skill level of the operator, determine whether the productivity of the machine is deteriorating and provide a service notice signal in response to the step of determining whether the productivity of the machine is deteriorating.

24. The system of claim 23, wherein the determination of whether the productivity of the machine is deteriorating is determined as a function of at least one of the change in the productivity of the machine, the change in the skill level of the operator and a normalized expected improvement in skill level data.

25. The system of claim 23, wherein the computer is adapted to generate at least one message record, the message record including the service notice signal and including at least one communication device adapted to receive the message record and provide the message record to at least one of the operator, a service organization, a customer and an owner of the machine.

26. A system for determining when a work machine needs service, comprising:

at least one machine sensor adapted to provide at least one machine sensor signal indicative of an operation performed by the machine, a payload handled by the machine and an amount of fuel consumed by the machine; and at least one data storage device adapted to store on a storage medium information including normalized operator productivity data for at least one work cycle and normalized expected improvement in skill level data;

a computer adapted to
  receive the sensor signals,
  calculate a productivity of the machine,
  determine a skill level of an operator, the skill level of the operator being determined by comparing the productivity of the machine with the normalized operator productivity data for the work cycle,
  calculate a change in the productivity of the machine and the skill level of the operator,
  determine whether the productivity of the machine is deteriorating as a function of at least one of the change in the productivity of the machine, the change in the skill level of the operator and the normalized expected improvement in the skill level data,
  provide a service notice signal in response to the step of determining whether the productivity of the machine is deteriorating,
  generate at least one message record,
  the message record including the service notice signal; and at least one communication device adapted to receive the message record and provide the message record to at least one of the operator, a service organization, a customer and an owner of the machine.

27. The system of claim 26, wherein the productivity is a function of the amount of fuel consumed and at least one of the payload handled by the machine and the operation performed by the machine.

28. A work machine adapted to be controlled by an operator and for acting upon a load through a plurality of work cycles, comprising:

a frame;

a plurality of ground engaging devices supporting the frame;

an operator compartment supported by the ground engaging devices;

an implement having a linkage for operably connecting the implement to the frame;

an engine operably coupled to the ground engaging devices; and a system for determining fees to be paid by a customer that are based on machine productivity, including:

at least one machine sensor adapted to provide at least one machine sensor signal indicative of an operation performed by the machine, a payload handled by the machine and an amount of fuel consumed by the machine; and a computer adapted to receive the sensor signals, calculate a productivity of the machine, determine a skill level of the operator of the machine, the skill level of the operator being determined by comparing the productivity of the machine with a normalized operator productivity data for the work cycle, and select an agreement establishing a price in response to the skill level.

29. The work machine of claim 28, wherein the productivity is a function of the amount of fuel consumed and at least one of the payload handled by the machine and the operation performed by the machine.

30. The work machine of claim 28, wherein the agreement establishes at least one minimum productivity limit and the corresponding price.

31. The work machine of claim 28, including at least one communication device adapted to receive the price and provide the price to at least one of the operator, a service organization, the customer and an owner of the machine.

32. A work machine adapted to be controlled by an operator and for acting upon a load through a plurality of work cycles, comprising:

a frame;

a plurality of ground engaging devices supporting the frame;

an operator compartment supported by the ground engaging devices;

an implement having a linkage for operably connecting the implement to the frame;

an engine operably coupled to the ground engaging devices; and a system for determining when the work machine needs service, including:

at least one machine sensor adapted to provide at least one machine sensor signal indicative of an operation performed by the machine, payload handled by the machine and amount of fuel consumed by the machine; and a computer adapted to receive the sensor signals, calculate productivity of the machine, determine a skill level of the operator, calculate change in the productivity of the machine and skill level of the operator, determine whether the productivity of the machine is deteriorating and provide a service notice signal in response to the step of determining whether the productivity of the machine is deteriorating.

33. The work machine of claim 32, wherein the determination of whether the productivity of the machine is deteriorating is determined as a function of at least one of the change in the productivity of the machine, the change in the skill level of the operator and a normalized expected improvement in skill level data.

34. The work machine of claim 32, wherein the computer is adapted to generate at least one message record, the message record including the service notice signal and including at least one communication device adapted to receive the message record and provide the message record to at least one of the operator, a service organization, a customer and an owner of the machine.

35. A system for determining fees to be paid by a customer that are based on machine productivity, comprising:

at least one machine sensor adapted to provide at least one machine sensor signal indicative of an operation performed by a machine, a payload handled by the machine and an amount of fuel consumed by the machine; and a computer adapted to receive the sensor signals, calculate a productivity of the machine, determine a skill level of an operator of the machine, the skill level of the operator being determined by comparing the productivity of the machine with a normalized operator productivity data for a work cycle, and select an agreement establishing a price in response to the skill level.

36. The system of claim 35, wherein the productivity is a function of the amount of fuel consumed and at least one of the payload handled by the machine and the operation performed by the machine.

37. The system of claim 35, wherein the agreement establishes at least one minimum productivity limit and the corresponding price.

38. The system of claim 35, including at least one communication device adapted to receive the price and provide the price to at least one of the operator, a service organization, the customer and an owner of the machine.

* * * * *